(12) United States Patent
Honda

(10) Patent No.: US 9,745,887 B2
(45) Date of Patent: Aug. 29, 2017

(54) ENGINE COOLING SYSTEM

(71) Applicant: ISUZU MOTORS LIMITED, Tokyo (JP)

(72) Inventor: Taku Honda, Hiratsuka (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 15/022,835

(22) PCT Filed: Oct. 3, 2014

(86) PCT No.: PCT/JP2014/076552
§ 371 (c)(1),
(2) Date: Mar. 17, 2016

(87) PCT Pub. No.: WO2015/064301
PCT Pub. Date: May 7, 2015

(65) Prior Publication Data
US 2016/0230641 A1 Aug. 11, 2016

(30) Foreign Application Priority Data

Oct. 30, 2013 (JP) .................................. 2013-225544

(51) Int. Cl.
*F01P 3/22* (2006.01)
*F02G 5/00* (2006.01)
(Continued)

(52) U.S. Cl.
CPC .............. *F01P 3/2285* (2013.01); *F01K 5/02* (2013.01); *F01K 9/003* (2013.01); *F01P 3/12* (2013.01);
(Continued)

(58) Field of Classification Search
CPC ...... F01K 5/02; F01K 9/003; F01P 3/12; F01P 3/2285; F01P 7/165; F01P 9/02;
(Continued)

(56) References Cited

U.S. PATENT DOCUMENTS

| | | | |
|---|---|---|---|
| 2004/0255593 A1* | 12/2004 | Brasz | F02C 6/18 60/772 |
| 2008/0087017 A1* | 4/2008 | Van Nimwegen | F01N 3/005 60/599 |
| 2014/0230761 A1* | 8/2014 | Pilavdzic | F01P 3/22 123/41.21 |

FOREIGN PATENT DOCUMENTS

| | | |
|---|---|---|
| JP | 58-88409 | 5/1983 |
| JP | 11-51582 | 2/1999 |

(Continued)

OTHER PUBLICATIONS

International Search Report dated Dec. 22, 2014 in corresponding International Application No. PCT/JP2014/076552.

*Primary Examiner* — Mark Laurenzi
*Assistant Examiner* — Dapinder Singh
(74) *Attorney, Agent, or Firm* — Staas & Halsey LLP

(57) ABSTRACT

An engine cooling system, capable of reducing vehicle weight caused by employing a Rankine cycle and capable of improving Rankine cycle performance, including some inlet-side cooling water of a radiator is used as a heating source for a first evaporator and some outlet-side cooling water of a sub-radiator is used as a cooling source for a condenser, a coolant that has passed through an expander, a second evaporator, and a compressor in a cooling cycle for an air conditioner, vaporized, cooled and liquefied by passing through a side to be cooled of the condenser in the Rankine cycle.

4 Claims, 1 Drawing Sheet

(51) Int. Cl.
  *F01P 7/16*    (2006.01)
  *F01K 5/02*    (2006.01)
  *F01K 9/00*    (2006.01)
  *F01P 3/12*    (2006.01)
  *F01P 9/02*    (2006.01)

(52) U.S. Cl.
  CPC ............. *F01P 7/165* (2013.01); *F01P 9/02* (2013.01); *F02G 5/00* (2013.01); *F01P 2060/02* (2013.01); *F01P 2060/16* (2013.01); *Y02T 10/166* (2013.01)

(58) Field of Classification Search
  CPC ..... F01P 2060/02; F01P 2060/16; F02G 5/00; Y02T 10/166
  USPC .......................................................... 60/618
  See application file for complete search history.

(56) References Cited

FOREIGN PATENT DOCUMENTS

| | | |
|---|---|---|
| JP | 2005-186879 | 7/2005 |
| JP | 2010-64527 | 3/2010 |

\* cited by examiner

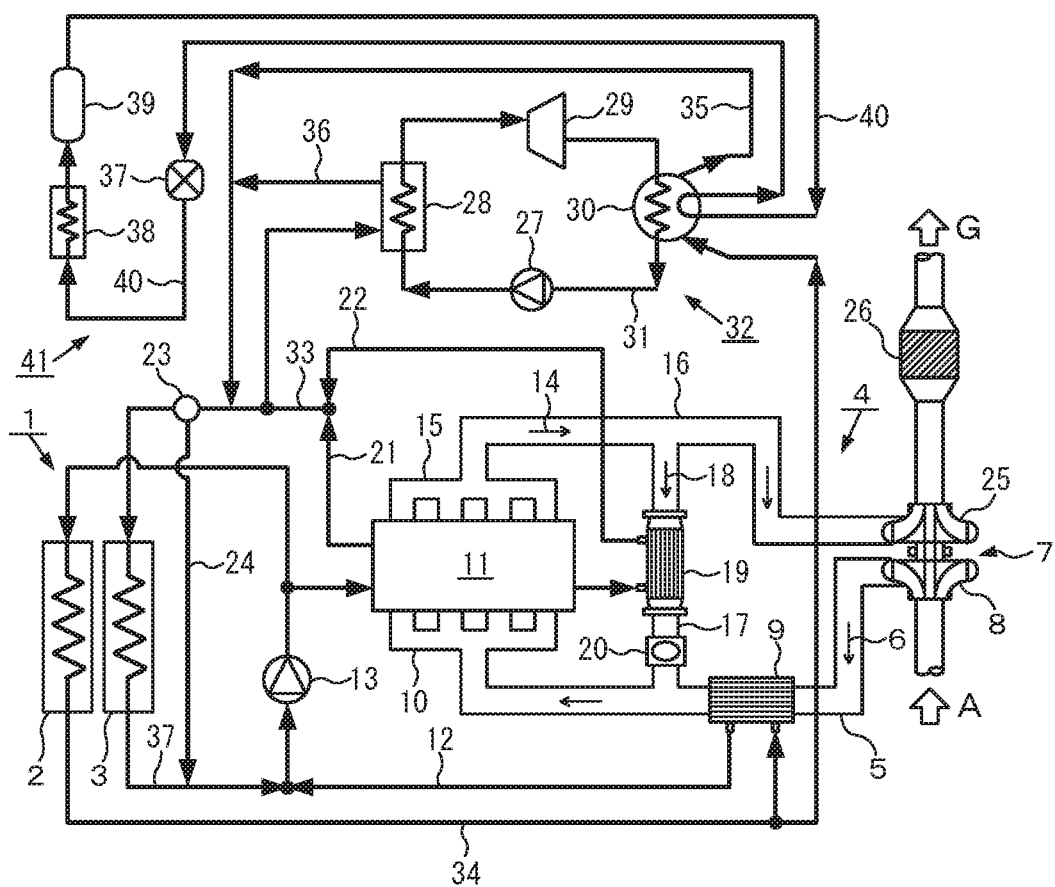

ENGINE COOLING SYSTEM

CROSS-REFERENCE TO RELATED APPLICATIONS

This application is a U.S. National Stage Application, which claims the benefit under 35 U.S.C. §371 of PCT International Patent Application No. PCT/JP2014/076552, filed Oct. 3, 2014, which claims the foreign priority benefit under 35 U.S.C. §119 of Japanese Patent Application No. 2013-225544, filed Oct. 30, 2013, the contents of which are incorporated herein by reference.

TECHNICAL FIELD

The present invention relates to an engine cooling system, and more specifically relates to an engine cooling system including a Rankine cycle with an improved performance while suppressing an increase in vehicle weight caused by employing the Rankine cycle.

BACKGROUND ART

Conventionally, there has been a proposal to employ a Rankine cycle in a vehicle in order to recover waste heat from an engine and thereby improve the fuel economy, as described in, for example, Japanese patent application Kokai publication No. 11-51582 (Patent Literature 1). For example, engine-main-body cooling water heated by an engine main body is used as a heating source of a Rankine cycle while intercooler cooling water cooled by a sub-radiator is used as a cooling source, so that a temperature difference between these flows of cooling water can be recovered as a power in a compressor (turbine).

However, when such a Rankine cycle is employed on a vehicle, the vehicle weight is increased. This may counterbalance the effect of improving the fuel economy.

On the other hand, the above-described engine-main-body cooling water and intercooler cooling water are air-cooled respectively in a radiator and a sub-radiator, which are disposed at a front surface of a vehicle. However, since a condenser for an air conditioner is disposed in front of the radiator and the sub-radiator, the condenser blocks vehicle-speed wind from flowing through the vehicle. Hence, the Rankine cycle may not be provided with cooling water having a sufficient temperature difference.

PRIOR ART DOCUMENT

Patent Document 1: Japanese patent application Kokai publication No. 11-51582

SUMMARY OF THE INVENTION

An object of the present invention is to provide an engine cooling system capable of suppressing an increase in vehicle weight caused by employing a Rankine cycle and capable of improving the Rankine cycle performance.

In order to achieve the above object, an engine cooling system of the present invention is an engine cooling system including: a Rankine cycle configured such that a first coolant circulates through a cooling pump, an evaporator, an expander, and a condenser in this order; a cooling cycle for an air conditioner configured to cool a vehicle by utilizing a vaporization of a liquid second coolant; a radiator which is disposed at a front surface of the vehicle, and through which engine-main-body cooling water flows; and a sub-radiator through which intercooler cooling water flows. The engine cooling system uses some of inlet-side cooling water of the radiator as a heating source for the evaporator, and some of outlet-side cooling water of the sub-radiator as a cooling source for the condenser. The engine cooling system is characterized in that the vaporized second coolant is cooled and again liquefied by using some of the outlet-side cooling water of the sub-radiator in the condenser.

According to the engine cooling system of the present invention, unlike a conventional case, a vaporized coolant in the cooling cycle for the air conditioner is liquefied not by an air-cooled condenser disposed at a front surface of a vehicle, but by utilizing some of the outlet-side cooling water of the sub-radiator in the evaporator of the Rankine cycle. This eliminates the need of providing a vehicle with such an air-cooled condenser, and makes it possible to configure the cooling cycle for the air conditioner of water-cooled type and to downsize the entire system. Hence, it is possible to suppress an increase in vehicle weight caused by employing the Rankine cycle.

Moreover, since no air-cooled condenser for an air conditioner is present at the front surface of the vehicle, this reduces the air flow resistance for the sub-radiator and the radiator, and makes it possible to provide the Rankine cycle with cooling water having a sufficient temperature difference, and improve the performance of the Rankine cycle.

BRIEF DESCRIPTION OF THE DRAWING

FIG. 1 is a configuration diagram of an engine cooling system according to an embodiment of the present invention.

DETAILED DESCRIPTION

Hereinafter embodiments of the present invention will be described with reference to the drawing. FIG. 1 shows an engine cooling system according to an embodiment of the present invention.

This engine cooling system includes a sub-radiator 2 and a radiator 3 disposed in this order from a front surface of a vehicle 1. The sub-radiator 2 and the radiator 3 are configured to perform air-cooling by utilizing vehicle-speed wind and cooling wind of a cooling fan (not shown) when the vehicle 1 is running or idling.

In a diesel engine 4, which is a cooling target of the engine cooling system, air A is drawn to an intake passage 5, and passes as drawn air 6 through an air cleaner not shown. The drawn air 6 is compressed by a compressor 8 of a turbocharger 7. After cooled by a water-cooled intercooler 9, the drawn air 6 is supplied to an engine main body 11 via an intake manifold 10.

Intercooler cooling water 12 used for cooling with the intercooler 9 is forced to circulate between the intercooler 9 and the sub-radiator 2 by a water pump 13.

The drawn air 6 supplied to the engine main body 11 is mixed with a fuel and burned, thereby generating a thermal energy. Then, a burned gas 14 thus obtained is discharged from an exhaust manifold 15 to an exhaust passage 16. Some of the burned gas 14 is diverted as an exhausted gas recirculation (EGR) gas 18 into an EGR passage 17, which is located on a downstream side of the intercooler 9 and connected to the intake passage 5. To the EGR passage 17, a water-cooled EGR cooler 19 and an EGR valve 20 configured to adjust a flow amount of the EGR gas 18 are disposed in this order from the exhaust passage 16 side.

Flow amounts of engine-main-body cooling water 21 for cooling the engine main body 11 and EGR-cooler cooling water 22 used for cooling in the EGR cooler 19 are regulated by a thermostat 23. The engine-main-body cooling water 21 and the EGR-cooler cooling water 22 are forced to circulate between the radiator 3 and corresponding one of the engine main body 11 and the EGR cooler 19 by the water pump 13.

On the other hand, cooling water 24 diverted from the thermostat 23 during warming-up time of the engine main body 11 circulates without passing through the radiator 3. Note that some of the engine-main-body cooling water 21 normally flows as the EGR-cooler cooling water 22.

A portion of the burned gas 14 which is not diverted to the EGR passage 17 is released as an exhaust gas G into the atmosphere after an exhaust gas purification device 26 including DPF, SCR, and the like purifies harmful substances by driving the rotation of a turbine 25 of the turbocharger 7.

Further, this engine cooling system is provided with a Rankine cycle 32 in parallel to the conventional engine cooling system including the sub-radiator 2 and the radiator 3. The Rankine cycle 32 is configured such that a first coolant 31 circulates through a cooling pump 27, a first evaporator 28, a first expander 29, and a first condenser 30 in this order.

To a heating side of the first evaporator 28 in this Rankine cycle 32, some of inlet-side cooling water 33 of the radiator 3 (the engine-main-body cooling water 21 and the EGR-cooler cooling water 22 after heating) flows by by-passing an upstream side of the thermostat 23.

Moreover, to a cooling side of the first condenser 30, some of outlet-side cooling water 34 of the sub-radiator 2 (the intercooler cooling water 12 after air-cooling) is diverted from the vicinity of an inlet of the intercooler 9. After passing through the first condenser 30, the outlet-side cooling water 34 as cooling water 35 merges with cooling water 36 which has passed through the first evaporator 28.

The coolant 31 which flows through the Rankine cycle 32 is compressed in a liquid state in the cooling pump 27, and heated at a constant pressure by some of the inlet-side cooling water 33 of the radiator 3 in the first evaporator 28, so that the coolant 31 is turned into an over-heated vapor at high pressure. After an adiabatic expansion in the first expander 29, the coolant 31 is cooled at a constant pressure by some of the outlet-side cooling water 34 of the sub-radiator 2 in the first condenser 30, and returned to a liquid again.

The engine cooling system as described above includes a cooling cycle 41 for an air conditioner. The cooling cycle 41 is configured such that a second coolant 40 circulates through a second expander 37, a second evaporator 38, a compressor 39, and a side to be cooled of the first condenser 30 in the Rankine cycle 32 in this order.

In the cooling cycle 41 for the air conditioner, the second coolant 40 in a gas state is compressed into a semi-liquid state at high temperature and high pressure by the compressor 39. The second coolant 40 is cooled and further liquefied by some of the outlet-side cooling water 34 of the sub-radiator 2 in the first condenser 30, so that the second coolant 40 is turned into a liquid in a mist form at low pressure and low temperature by the second expander 37. Then, the second coolant 40 is vaporized again through heat exchange with air in the second evaporator 38 to generate cooling wind, thereby cooling the vehicle 1.

As described above, unlike a conventional case, the second coolant 40 of the cooling cycle 41 for the air conditioner is liquefied not by an air-cooled condenser for the air conditioner disposed at the front surface of the vehicle 1 but by utilizing some of the outlet-side cooling water 34 air-cooled by the sub-radiator 2 in the first evaporator 30 of the Rankine cycle 32. This eliminates the need of providing the vehicle 1 with such an air-cooled condenser, and makes it possible to configure the cooling cycle 41 for the air conditioner of water-cooled type and to downsize the entire system. Hence, it is possible to suppress an increase in vehicle weight caused by employing the Rankine cycle 32.

Moreover, since no air-cooled condenser for the air conditioner is present at the front surface of the vehicle 1, this reduces the air flow resistance for the sub-radiator 2 and the radiator 3, and makes it possible to provide the Rankine cycle 32 with the cooling water 33 and 34 having a sufficient temperature difference, and improve the performance of the Rankine cycle 32.

Note that it is needless to say that the cooling target of the engine cooling system of the present invention is not limited to the diesel engine 4 as described above, and includes a gasoline engine, as well.

The invention claimed is:

1. An engine cooling system comprising:
    a Rankine cycle configured such that a first coolant circulates through a cooling pump, an evaporator, an expander, and a condenser in this order;
    a cooling cycle for an air conditioner configured to cool a vehicle by utilizing a vaporization of a liquid second coolant;
    a radiator which is disposed at a front surface of the vehicle, and through which engine-main-body cooling water flows; and
    a sub-radiator through which an intercooler cooling water flows, the engine cooling system using some of inlet-side cooling water of the radiator as a heating source for the evaporator, and some of outlet-side cooling water of the sub-radiator as a cooling source for the condenser,
    wherein the vaporized second coolant is cooled and again liquefied by using some of the outlet-side cooling water of the sub-radiator in the condenser.

2. The engine cooling system according to claim 1, wherein the cooling cycle for the air conditioner is configured such that the second coolant circulates through a second expander, a second evaporator, a compressor, and a side to be cooled of the condenser in this order.

3. The engine cooling system according to claim 1, wherein the inlet-side cooling water of the radiator having passed through the evaporator merges with the outlet-side cooling water of the sub-radiator having passed through the condenser and is then supplied to the radiator.

4. The engine cooling system according to claim 1 or 2, wherein the inlet-side cooling water of the radiator having passed through the evaporator merges with the outlet-side cooling water of the sub-radiator having passed through the condenser and is then supplied to the radiator.

* * * * *